US012556266B1

(12) United States Patent
Hicks

(10) Patent No.: US 12,556,266 B1
(45) Date of Patent: Feb. 17, 2026

(54) SYSTEM FOR MAINTAINING SATELLITES IN ORBITAL CONFIGURATION TO MITIGATE INTERFERENCE WITH GEOSYNCHRONOUS SATELLITES

(71) Applicant: AMAZON TECHNOLOGIES, INC., Seattle, WA (US)

(72) Inventor: Michael Thomas Hicks, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 321 days.

(21) Appl. No.: 18/335,398

(22) Filed: Jun. 15, 2023

(51) Int. Cl.
*H04B 7/185* (2006.01)
*H04B 7/195* (2006.01)

(52) U.S. Cl.
CPC ..... *H04B 7/18519* (2013.01); *H04B 7/18513* (2013.01); *H04B 7/18523* (2013.01); *H04B 7/195* (2013.01)

(58) Field of Classification Search
CPC ............ H04B 7/18519; H04B 7/18513; H04B 7/18523; H04B 7/195; H04B 7/1851; H04B 7/18521; H04B 7/18563; H04B 7/18576; H04B 10/118; H04B 7/0617; H04B 7/185; H04B 7/18515
See application file for complete search history.

(56) References Cited

U.S. PATENT DOCUMENTS

| 11,414,218 B1 * | 8/2022 | Concha | ................... B64G 1/36 |
| 2018/0006710 A1 * | 1/2018 | Buer | .................. H04B 7/18519 |
| 2021/0273719 A1 * | 9/2021 | Wang | ................. H04B 7/18513 |

(Continued)

FOREIGN PATENT DOCUMENTS

WO   WO-2024118425 A1 *   6/2024   .......... B64G 1/1007

OTHER PUBLICATIONS

"Chapter 3—The Classical Orbital Elements (COEs)" Introduction to Orbital Mechanics, Pressbooks, 49 pgs. Retrieved from the Internet: URL: https://oer.pressbooks.pub/lynnanegeorge/chapter/chapter-3-the-classical-orbital-elements-coes/.

(Continued)

*Primary Examiner* — Lana N Le
(74) *Attorney, Agent, or Firm* — Lindauer Law, PLLC

(57) ABSTRACT

Many satellites comprising a constellation are arranged in non-geosynchronous orbits (NGSO) forming a regular lattice arrangement in terms of right ascension ascending node (RAAN) and mean anomaly (M), with the orbital parameters specified by the position in the lattice. A set of satellites form a traffic lane having a nonzero RAAN/M slope. Lattice arrangements may be determined based on operational parameters such as antenna pattern beamwidth. The regular lattice may be configured such that adjacent satellites in each lane provide coverage for areas that are subject to interference exclusion limitations. For example, to prevent interference between an NGSO satellite and the geosynchronous satellite's service, the NGSO satellite is prohibited from transmitting towards a ground terminal that may be looking towards the geosynchronous satellite. The regular lattice may also be configured such that lanes in the regular lattice provide coverage for at least a portion of exclusion areas in adjacent lanes.

20 Claims, 11 Drawing Sheets

(56) References Cited

U.S. PATENT DOCUMENTS

2023/0137147 A1\* 5/2023 Wang ................ H04B 7/18563
455/13.1
2023/0361860 A1\* 11/2023 Qiao .................... H04B 7/1853

OTHER PUBLICATIONS

Enkh, Mandakh, "Bouquet: A Satellite Constellation Visualization Program for Walkers and Lattice Flower Constellations", The Office of Graduate Studies of Texas A&M University, Aug. 2011, 78 pgs. Retrieved from the Internet: URL: https:https://oaktrust.library.tamu.edu/bitstream/handle/1969.1/ETD-TAMU-2011-08-10103/ENKH-THESIS.pdf;sequence=2.

Kidder, et al., "A Satellite Constellation to Observe the Spectral Radiance Shell of Earth" Cooperative Institute for Research in the Atmosphere, Colorado State University, Sep. 20-23, 2004, 5 pgs. Retrieved from the Internet: URL: https://ams.confex.com/ams/13SATMET/techprogram/paper_79038.htm.

Lee, Sang Hyun, "Coverage Optimization Using Lattice Flower Constellations" Office of Graduate and Professional Studies of Texas A&M University, May 2015, 161 pgs. Retrieved from the Internet: URL: https://oaktrust.library.tamu.edu/bitstream/handle/1969.1/155222/LEE-DISSERTATION-2015.pdf;sequence=1.

\* cited by examiner

US 12,556,266 B1

SYSTEM FOR MAINTAINING SATELLITES IN ORBITAL CONFIGURATION TO MITIGATE INTERFERENCE WITH GEOSYNCHRONOUS SATELLITES

BACKGROUND

Satellites in non-geosynchronous orbits (NGSO) move relative to a body they are orbiting, such as the Earth. Satellites in NGSOs provide several advantages compared to geosynchronous orbits, including reduced latency, shorter communication path lengths, and so forth. Devices using an NGSO satellite for communication may also be moving relative to the Earth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
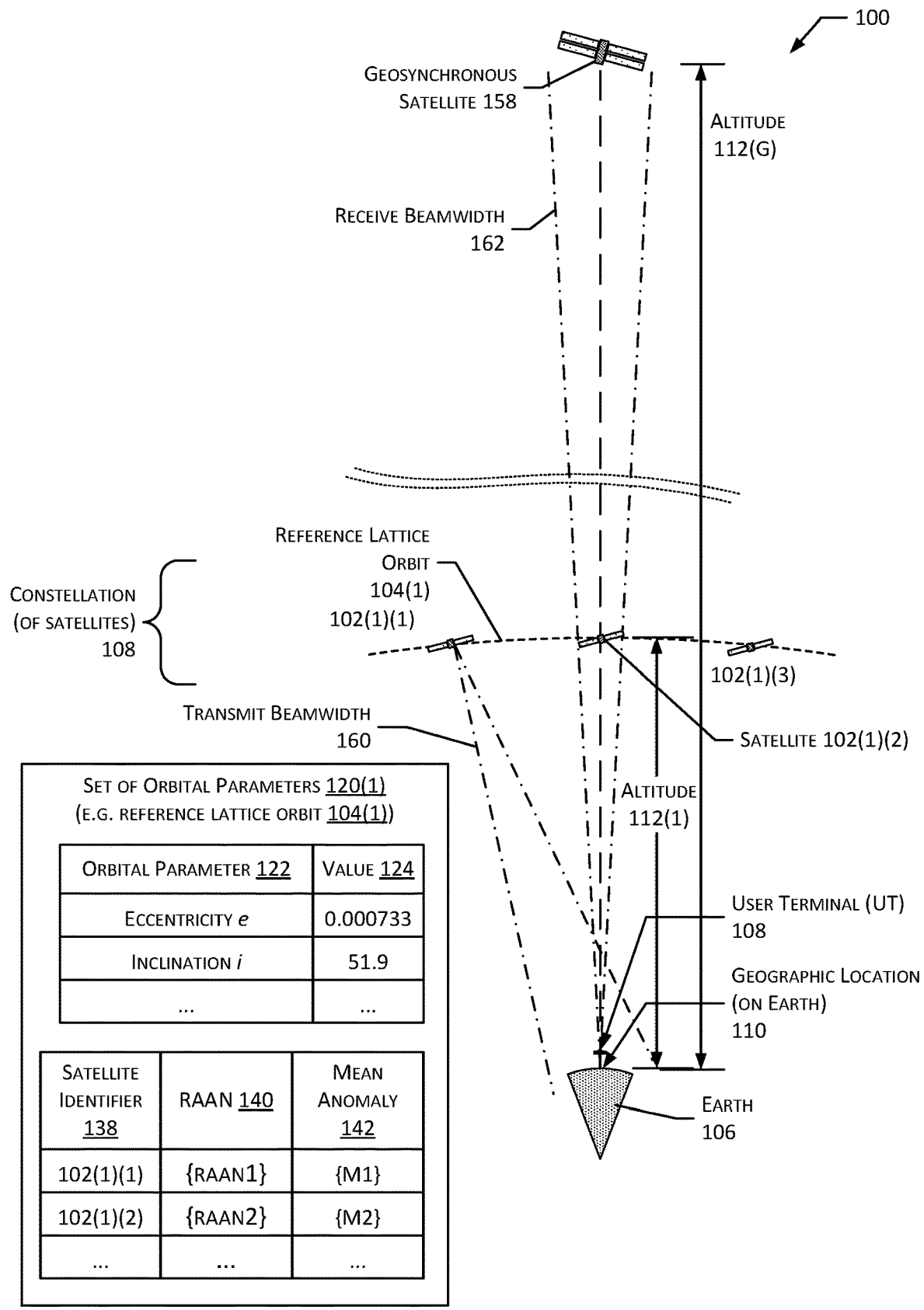
FIG. 1 illustrates a system for establishing and maintaining an orbital configuration for a constellation of satellites that mitigates interference with geosynchronous satellites, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Non-geosynchronous orbit (NGSO) satellites move relative to a body such as the Earth, Moon, Mars, and so forth. Satellites in NGSOs may be part of a network to provide communication service between devices, such as user terminals (UT) located on or near the body. For example, a first UT at a first location on the Earth may send user data to a first satellite that is in range of the first UT. The first satellite may send the user data to a ground station, another satellite, and so forth. Likewise, data destined for the first UT may be sent by the ground station to the first satellite, which then sends the data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth.

A period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. In comparison, a geosynchronous satellite in a geosynchronous orbit (GSO) has an orbital period that coincides with the rotation of the Earth, so a geosynchronous satellite appears to remain motionless with respect to the Earth.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth may also be present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGSO satellite at an altitude of 600 km only introduces about 4 ms of latency. As a result, compared to using geosynchronous satellites, the use of NGSO satellites significantly reduces latencies due to signal travel times.

Several factors limit the use, number, and placement of geosynchronous satellites. Orbital dynamics, fuel consumption required to keep a satellite in a particular orbit, radio propagation characteristics, and so forth result in a finite number of geosynchronous orbital "slots". Given these limitations and the increasing demand for communication services, geosynchronous satellites are unable to satisfy the increasing demands of communication services.

Using a constellation of many NGSO satellites offers significant benefits. Latency is dramatically reduced, improving usefulness for communication. Shorter distances between the UT and the satellite allows for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While a constellation of many NGSO satellites provides various operational benefits, careful consideration must be given to the arrangement of the satellites in their respective orbits to avoid adverse situations such as interference between the NGSO satellites and other satellite operators, collisions, and so forth. NGSO satellites that use the same frequencies during operation may be operated to avoid interference between GSO satellites and their ground terminals that are receiving signals from satellites in GSO. For example, an NGSO satellite may be prohibited from transmitting towards particular areas known as GSO exclusion areas on the Earth when the NGSO satellite is positioned within the receive beamwidth of a possible ground station that may be directed towards the GSO. The intention is to prevent signals from the NGSO satellite(s) from interfering with signals from the GSO satellite at the possible ground station and may also mitigate the possible ground station from interfering with the NGSO satellite(s).

Traditional systems of determining satellite orbits have relied on the concepts of specifying planes for one or more satellites. Each plane may be defined by the parameters of inclination and longitude of the ascending node. A traditional constellation of satellites may be represented by a plurality of planes having different parameters. However, designing a constellation in terms of planes may result in orbits that exhibit substantial limitations. For example, constellation orbits planned using planes may be difficult to optimize to reduce the size of GSO exclusion areas, may require larger numbers of satellites to provide coverage for service, and so forth.

Described in this disclosure are techniques and systems for determining reference lattice orbits comprising orbital parameters for a constellation of satellites and maintaining satellites in their respective orbits. A set of orbital parameters are determined that result in each satellite being associated with a point in a regular lattice as specified with respect to right ascension ascending node (RAAN) and mean anomaly (M). Within the regular lattice a traffic lane is specified that includes a set of satellites that provide coverage along a contiguous strip of the Earth. This set of satellites in the traffic lane share a common primary direction with respect to the lattice. Adjacent traffic lanes may move in opposite or alternating directions. A slope of the primary direction may be calculated as a change in RAAN divided by a change in M. A nonzero slope lattice may be selected that provides orbits with several advantages. For example, a nonzero slope lattice may provide for mitigation of GSO exclusion areas, improving overall coverage without requiring additional satellites.

Once a reference lattice orbit comprising a set of orbital parameters has been determined that meet the desired operating criteria, satellites may be deployed according to those parameters, such as a particular RAAN and M value. While in orbit, the satellites will experience some perturbation, drag, and other influences affecting their position, and so will be maneuvered to maintain the desired orbital parameters and maintain relative position with respect to other satellites in the constellation.

Different reference lattice orbits may be specified for different altitudes, providing shells of satellites in the constellation. For example, the constellation may utilize two or more shells, each at a different altitude, and with a particular regular lattice arrangement differing from the other shells.

To facilitate these maneuvers, each satellite includes one or more sensors. These sensors are used to determine position data of that satellite. For example, the sensors may include a global navigation satellite system (GNSS) receiver such as a Global Position System (GPS) receiver that provides position data such as the coordinates of the satellite, relative to Earth, at particular times. This highly precise position data allows for actual orbital parameters to be determined. Once the actual orbital parameters are known, corresponding maneuvering vectors may be determined to restore the satellite to the desired reference orbit. The maneuvering vectors may then be used to determine maneuvering instructions that operate the satellite to move.

The system and techniques described in this disclosure make possible a constellation of NGSO satellites that maximizes coverage while mitigating GSO exclusion areas. As a result, operation is substantially improved.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period or time it takes for a satellite to complete a single orbit. A satellite in a geosynchronous orbit (GSO) at an altitude of 35,800 km may appear to be fixed with respect to the ground because of the period that geosynchronous orbit matches the rotation of the Earth. In comparison, a satellite in a non-geosynchronous orbit (NGSO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

The presence of geosynchronous satellites may also result in regulatory and operational requirements to avoid interfering with services provided by those geosynchronous satellites. For example, to prevent satellites in lower orbits from interfering with a possible ground terminal that may be receiving signals from the geosynchronous satellite, those satellites may be configured to avoid transmitting towards particular areas on Earth, known as GSO exclusion areas.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate infrastructure, latency, and other issues, satellites in NGSOs may be used. The altitude of an NGSO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGSO reduces the dispersion of electromagnetic signals. This allows the satellite in NGSO as well as the device communicating with the satellite to use a less powerful transmitter, use smaller antennas, and so forth. As mentioned above, satellites in the NGSO may be configured to avoid transmitting into GSO exclusion areas, to avoid interfering with service provided by a geosynchronous satellite.

The system 100 shown here comprises a plurality of satellites 102(1), 102(2), . . . , 102(S). Each satellite 102 is in a reference lattice orbit 104 relative to Earth 106. Satellites 102 in the same reference lattice orbit 104 may be separated from one another by some distance along the orbital path, as shown here. The reference lattice orbits 104 may be non-geosynchronous orbits (NGSOs). The plurality of satellites 102 form a constellation 108. The constellation 108 may comprise hundreds or thousands of satellites 102. In this notation, the first number in parentheses indicates the reference lattice orbit 104, and the second number in parentheses indicates a particular satellite 102 in that reference lattice orbit 104. For example, satellite 102(1)(1) is the first satellite 102 in the first reference lattice orbit 104(1).

Each satellite 102 may pass over a geographic location 110 on Earth 106 at some altitude 112. Satellites 102 in different reference lattice orbits 104 that pass over the same geographic location 110 would do so at different altitudes 112, resulting in a separation distance between those reference lattice orbits 104. For example, the first reference lattice orbit 104(1) may pass above the geographic location 110 at a first altitude 112(1) that is greater than a second altitude 112(2) (not shown) of a second reference lattice orbit 104(2) (not shown). The altitude 112 of an orbit may be measured either in terms of a radius from the center of the Earth 106, or alternatively as a height above ground for a fixed feature. For example, the altitude 112 may be relative to the geodetic center of the Earth 106, the spherical center of the Earth 106, and so forth.

Each reference lattice orbit 104 is associated with a particular set of orbital parameters 120. Each set comprises orbital parameters 122 and corresponding values 124 that define the orbit relative to the Earth 106. These orbital parameters 122 may include eccentricity (e), argument of perigee (ω), right ascension of the ascending node (RAAN) (Ω), mean anomaly (M), and so forth. In this illustration, overall parameters for the reference lattice orbit 104 may be specified, such as eccentricity and inclination. Individual satellites as specified by a satellite identifier 138 may have associated parameters such as RAAN 140 and M 142 that specify their relative location in the regular lattice. The orbital parameters 122 are discussed in more detail with regard to FIG. 2. The regular lattice is discussed in more detail with regards to FIGS. 5-11.

An orbital mechanics system (see FIG. 4) may be used to determine the set of orbital parameters 120 that describe the various reference lattice orbits 104. For example, the orbital parameters 122 of an individual satellite 102 may be determined based on the associated point in the regular lattice. In some implementations, the orbital parameters 122 may vary between shells. For example, a first set of orbital parameters 120(1) and a second set of orbital parameters 120(2) have different values 124 of eccentricity. This difference may provide a particular vertical separation distance between the shells at the geographic location 110. In some implementations, different individual orbits of the satellites 102 may be configured such that they are perigee locked with respect to different geographic poles to maintain vertical separation distance. For example, satellites 102 associated with a first traffic lane may be perigee locked to a position proximate to the north geographic pole of the Earth 106, while a second traffic lane is perigee locked to a position proximate to the south geographic pole of the Earth 106.

The orbital mechanics system or other system may be used to determine the set of orbital parameters 120 that describe a reference lattice orbit 104 which mitigates potential interference with one or more geosynchronous satellites 158. The geosynchronous satellites 158 may be at altitude 112(G). During their respective operation, a geosynchronous satellite 158 may transmit towards Earth 106, and a satellite 102 of the NGSO constellation 108 may transmit towards the Earth 106. For example, a transmit beamwidth 160 from a satellite 102(1)(1) is depicted. In another example, a transmit beamwidth 160 (not shown) from the geosynchronous satellite 158 may cover a relatively large portion of the Earth 106. The transmit beamwidth 160 impinges on Earth 106 and provides a coverage area or footprint on the Earth 106. In some implementations the coverage area provided by individual satellites 102 of the NGSO constellation 108 may vary in one or more of size or shape as time progresses, due to the relative motion of the satellite 102 with respect to Earth 106, changes in attitude of the satellite 102, operation of the antennas onboard the satellite 102, or other factors.

To avoid having transmissions from the NGSO constellation 108 potentially interfere with the signals from the geosynchronous satellite 158, the satellites 102 in the constellation 108 may be prevented from transmitting towards portions of the Earth 106 designated as GSO exclusion areas. Within a GSO exclusion area, a possible receive beamwidth 162 of a possible ground station (not necessarily the UT) may include a satellite 102 of the constellation 108. The GSO exclusion area is discussed in more detail with regard to FIG. 5. By using the techniques described herein, a reference lattice orbit 104 may be determined that provides several benefits, including establishment of traffic lanes within which satellites 102 are distributed and maintained. By maintaining satellites 102 within respective traffic lanes, satellites 102 within a given lane are able to provide overlapping coverage areas that mitigate the GSO exclusion areas.

Figure 2:
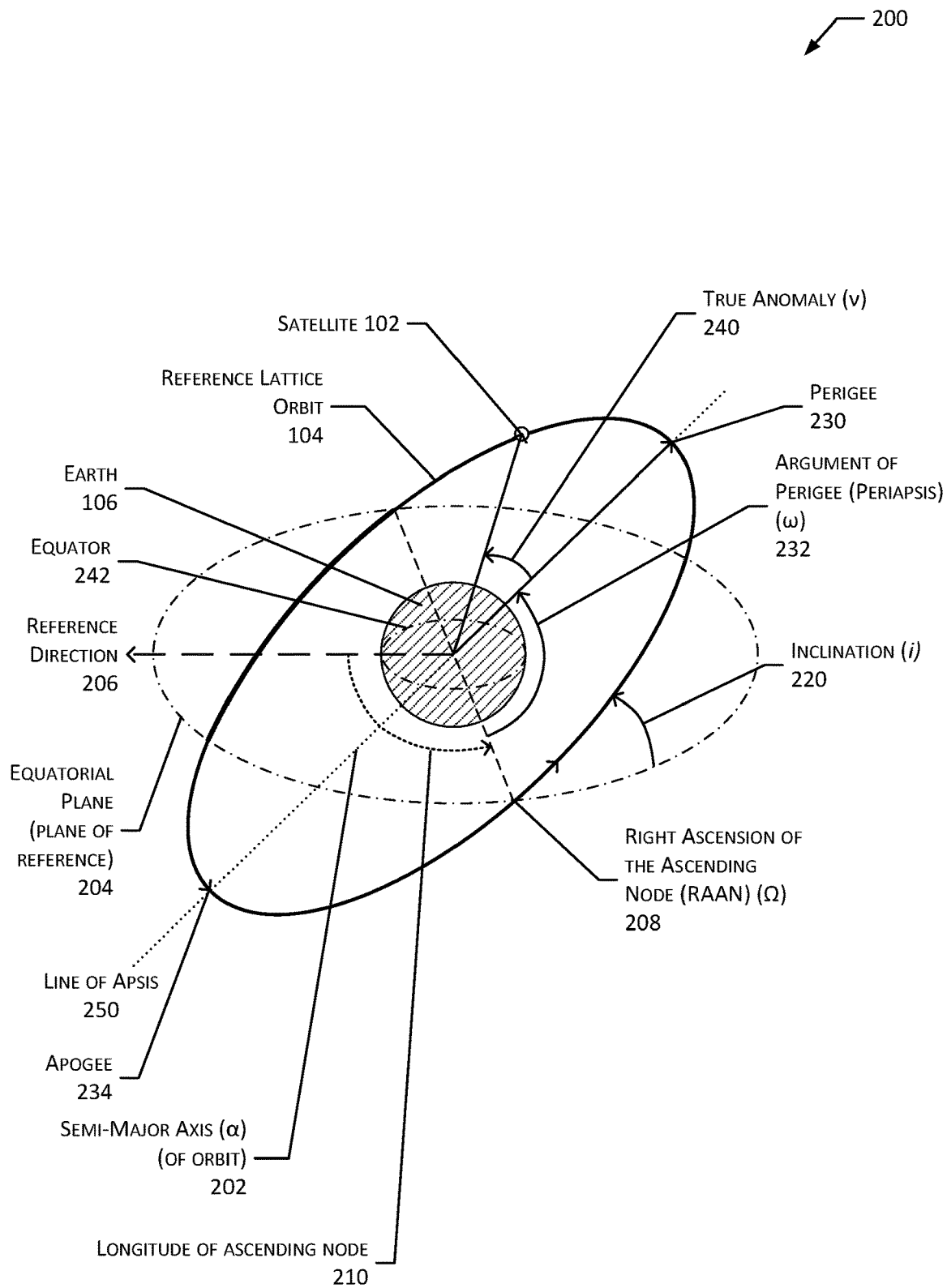
FIG. 2 illustrates orbital parameters associated with a satellite.

FIG. 2 illustrates at 200 orbital parameters 122 associated with a reference lattice orbit 104 of the satellite 102. The reference lattice orbit 104 defines an orbital plane. The reference lattice orbit 104 has a semi-major axis ($\alpha$) (SMA) 202. The semi-major axis 202 may represent one half the sum of the distance from the center of the Earth 106 to the perigee 230 and the apogee 234 of the reference lattice orbit 104. In some implementations, such as when eccentricity is relatively small, the semi-major axis 202 may be determined as the radius of the Earth 106 plus a desired altitude 112.

The perigee 230 (or more generally periapsis) is the point of closest approach of the reference lattice orbit 104 to the Earth 106. The apogee 234 is the point of farthest distance of the reference lattice orbit 104 to the Earth 106. A line of apsis 250 extends through the apogee 234, the Earth 106, and the perigee 230.

An equatorial plane 204 of the Earth 106 is shown. A reference direction 206 for the equatorial plane 204 may be specified. For example, the reference direction 206 may comprise, relative to Earth 106, a direction of the vernal equinox also known as the first point of Aries that specifies a line towards the constellation Aries that is along the intersection of the celestial equator that intersects the ecliptic.

An equator 242 of the Earth 106 is also shown. In some implementations the equatorial plane 204 may be specified with respect to the equator 242.

An inclination (i) 220 is indicative of the angle between the equatorial plane 204 and the orbital plane, as measured along a line that is perpendicular to a line of intersection between the reference lattice orbit 104 and the equatorial plane 204.

A longitude of ascending node 210 is shown. A right ascension of the ascending node (RAAN) ($\Omega$) 208 is shown. The RAAN 208 represents the angle in the equatorial plane 204 between the reference direction 206 and the ascending node 208.

An argument of perigee ($\omega$) 232 is indicative of the angle, in the orbital plane, from the intersection of the equatorial plane 204 and the orbital plane to the line extending from the Earth 106 to the point of perigee 230.

A true anomaly (v) 240 describes the angle between the perigee 230 and a position of the satellite 102 at a specified time. A mean anomaly (M) may be determined based on the true anomaly.

The mean anomaly may be calculated from the true anomaly (v) 240 as follows:

$$M = \mathrm{atan2}\left(-\sqrt{1-e^2}\sin v,\ -e-\cos v\right) + \pi - e\frac{\sqrt{1-e^2}\sin v}{1+e\cos v}$$

Equation 1

The following discussion of lattice orbits is described with respect to mean anomaly (M). In some implementations the lattice orbits may be specified with respect to the true anomaly 240. In the following figures and associated description, in some implementations, the mean anomaly M may be replaced with the true anomaly v.

Figure 3:
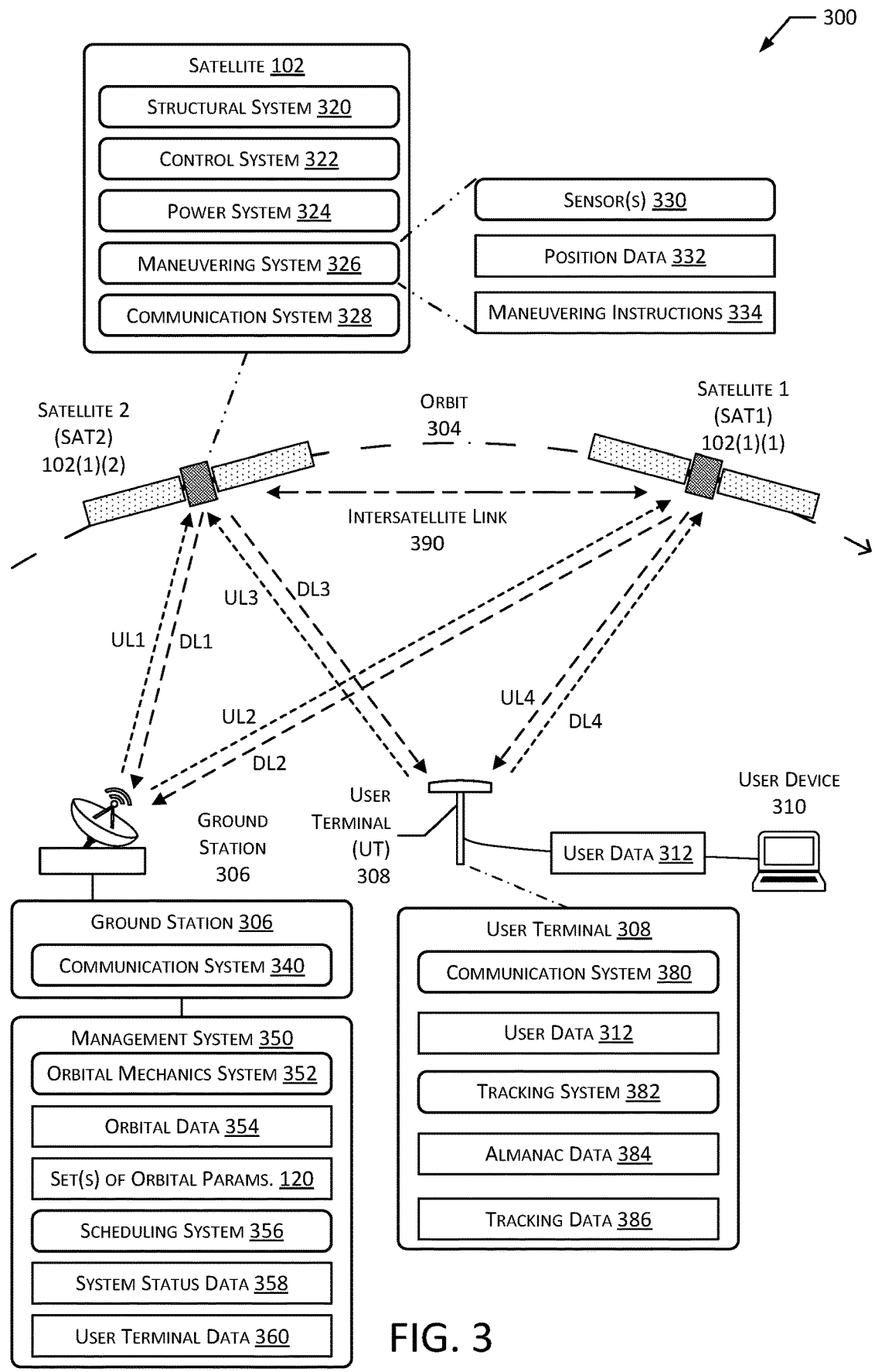
FIG. 3 illustrates systems associated with the constellation, according to some implementations.

FIG. 3 illustrates systems 300 associated with the constellation 108, according to some implementations.

The satellite 102 may comprise a structural system 320, a control system 322, a power system 324, a maneuvering system 326, and a communication system 328. In other implementations, some systems may be omitted or other systems added. One or more of these systems may be communicatively coupled with one another in various combinations. These systems are described in more detail with regard to FIG. 4.

The maneuvering system 326 maintains the satellite 102 in one or more of a specified orientation or orbit 304, such as a reference lattice orbit 104. For example, the maneuvering system 326 may stabilize the satellite 102 with respect to one or more axes. In another example, the maneuvering system 326 may move the satellite 102 to a specified orbit 304. The maneuvering system 326 may include one or more computing devices, thrusters, momentum wheels, solar sails, drag devices, and so forth. The maneuvering system 326 may use data from one or more sensors 330 during operation. The sensors 330 are discussed in more detail with regard to FIG. 4.

The maneuvering system 326 may use the sensors 330 to determine position data 332. The position data 332 may comprise information such as spatial and time coordinates that indicate the position of the satellite 102. For example, during operation the GNSS receiver may generate position data 332 comprising a time series of latitude, longitude, altitude, and time. The position data 332 may be used to calculate actual orbital parameters 122 for the satellite 102. Once the actual orbit 304 is determined, the maneuvering system 326 may determine one or more maneuvering vectors that, if executed, would move the satellite 102 to within a threshold variation of the reference lattice orbit 104. The maneuvering vectors may be used to determine maneuvering instructions 334 that specify various parameters, such as a maneuver start time, maneuver end time, orientation of the satellite 102 during the maneuver, duration of thrust, and so forth. The maneuvering system 326 may then execute the maneuvering instructions 334 to move the satellite 102.

In some implementations, one or more of these operations may be performed by the orbital mechanics system 352. For example, the satellite 102 may send the position data 332 to the orbital mechanicals system 352 that then determines the maneuvering instructions 334. The maneuvering instructions 334 may then be sent to the satellite 102 via the ground station 306. The maneuvering system 326 onboard the satellite 102 may execute the maneuvering instructions 334.

The communication system 328 provides communication with one or more other devices, such as other satellites 102, ground stations 306, user terminals 308, and so forth. The communication system 328 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other satellites 102, ground stations 306, user terminals 308, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 328 may be output to other systems, such as to the control system 322, for further processing. Output from a system, such as the control system 322, may be provided to the communication system 328 for transmission.

One or more ground stations 306 are in communication with one or more satellites 102. The ground stations 306 may pass data between the satellites 102 and a management system 350, networks such as the Internet, and so forth. The ground stations 306 may be emplaced on land, on vehicles, at sea, and so forth. Each ground station 306 may comprise a communication system 340. Each ground station 306 may use the communication system 340 to establish communication with one or more satellites 102, other ground stations 306, and so forth. The ground station 306 may also be connected to one or more communication networks. For example, the ground station 306 may connect to a terrestrial fiber optic communication network. The ground station 306 may act as a network gateway, passing user data 312 or other data between the one or more communication networks and the satellites 102. Such data may be processed by the ground station 306 and communicated via the communication system 340. The communication system 340 of a ground station 306 may include components similar to those of the communication system 328 of a satellite 102 and may perform similar communication functionalities. For example, the communication system 340 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 306 are in communication with a management system 350. The management system 350 is also in communication, via the ground stations 306, with the satellites 102 and the UTs 308. The management system 350 coordinates operation of the satellites 102, ground stations 306, UTs 308, and other resources of the system 300. The management system 350 may comprise one or more of an orbital mechanics system 352 or a scheduling subsystem 356.

The orbital mechanics system 352 may determine orbital data 354 that is indicative of a state of a particular satellite 102 at a specified time. In one implementation, the orbital mechanics system 352 may use the set of orbital parameters 120 associated with the satellites 102 in the constellation 108 to determine the orbital data 354 that predicts location, velocity, and so forth of particular satellites 102 at particular times or time intervals. In some implementations, the orbital mechanics system 352 may use data obtained from actual observations from tracking stations, the position data 332 received from the satellite 102, scheduled maneuvers, and so forth to determine the orbital data 354. The orbital mechanics system 352 may also consider other data, such as space weather, collision mitigation, orbital elements of known debris, and so forth to determine the orbital data 354.

The orbital mechanics system 352 may use the position data 332 to determine the maneuvering instructions 334. For example, the orbital mechanics system 352 may use the position data 332 acquired by a satellite 102 to determine actual orbital parameters of the satellite 102. The set of orbital parameters 120 that represent the reference lattice orbit 104 that is associated with the satellite 102 may be retrieved. Based on the difference between the actual orbital parameters and the specified set of orbital parameters 120, one or more maneuvers may be planned to place the satellite 102 within a threshold value of the reference lattice orbit 104.

The scheduling system 356 schedules resources to provide communication to the UTs 308. For example, the scheduling system 356 may determine handover data that indicates when communication is to be transferred from the first satellite 102(1) to the second satellite 102(2). Continuing the example, the scheduling system 356 may also specify communication parameters such as frequency, timeslot, and so forth. During operation, the scheduling system 356 may use information such as the orbital data 354, system status data 358, user terminal data 360, and so forth.

The system status data 358 may comprise information such as which UTs 308 are currently transferring data, satellite availability, current satellites 102 in use by respective UTs 308, capacity available at particular ground stations 306, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 358 may be indicative of past status, predictions of future status, and so forth. For example, the system status data 358 may include information such as projected data traffic for a specified interval of time based on previous transfers of user data 312. In another example, the system status data 358 may be indicative of future status, such as a satellite 102 being unavailable to provide communication service due to scheduled maneuvering, scheduled maintenance, scheduled decommissioning, and so forth.

The user terminal data 360 may comprise information such as a location of a particular UT 308. The user terminal data 360 may also include other information such as a priority assigned to user data 312 associated with that UT 308, information about the communication capabilities of that particular UT 308, and so forth. For example, a particular UT 308 in use by a business may be assigned a higher priority relative to a UT 308 operated in a residential setting. Over time, different versions of UTs 308 may be deployed, having different communication capabilities such as being able to operate at particular frequencies, supporting different signal encoding schemes, having different antenna configurations, and so forth.

The UT 308 includes a communication system 380 to establish communication with one or more satellites 102. The communication system 380 of the UT 308 may include components similar to those of the communication system 328 of a satellite 102 and may perform similar communication functionalities. For example, the communication system 380 may include one or more modems, digital signal processors, power amplifiers, antennas (including at least one antenna that implements multiple antenna elements, such as a phased array antenna), processors, memories, storage devices, communications peripherals, interface buses, and so forth. The UT 308 passes user data 312 between the constellation 108 of satellites 102 and the user device 310. The user data 312 includes data originated by the user device 310 or addressed to the user device 310. The UT 308 may be fixed or in motion. For example, the UT 308 may be used at a residence, or on a vehicle such as a car, boat, aerostat, drone, airplane, and so forth.

The UT 308 includes a tracking system 382. The tracking system 382 uses almanac data 384 to determine tracking data 386. The almanac data 384 provides information indicative of orbital elements of the orbit 304 of one or more satellites 102. For example, the almanac data 384 may comprise orbital elements such as "two-line element" data for the satellites 102 in the constellation 108 that are broadcast or otherwise sent to the UTs 308 using the communication system 380.

The tracking system 382 may use the current location of the UT 308 and the almanac data 384 to determine the tracking data 386 for the satellite 102. For example, based on the current location of the UT 308 and the predicted position and movement of the satellites 102, the tracking system 382 is able to calculate the tracking data 386. The tracking data 386 may include information indicative of azimuth, elevation, distance to the second satellite 102(2), time of flight correction, or other information at a specified time. The determination of the tracking data 386 may be ongoing. For example, the first UT 308 may determine tracking data 386 every 300 ms, every second, every five seconds, or at other intervals.

With regard to FIG. 3, an uplink is a communication link which allows data to be sent to a satellite 102 from a ground station 306, UT 308, or device other than another satellite 102. Uplinks are designated as UL1, UL2, UL3 and so forth. For example, UL1 is a first uplink from the ground station 306 to the second satellite 102(1)(2). In comparison, a downlink is a communication link which allows data to be sent from the satellite 102 to a ground station 306, UT 308, or device other than another satellite 102. For example, DL1 is a first downlink from the second satellite 102(1)(2) to the ground station 306. The satellites 102 may also be in communication with one another. For example, an intersatellite link 390 provides for communication between satellites 102 in the constellation 108.

The satellite 102, the ground station 306, the user terminal 308, the user device 310, the management system 350, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth.

Figure 4:
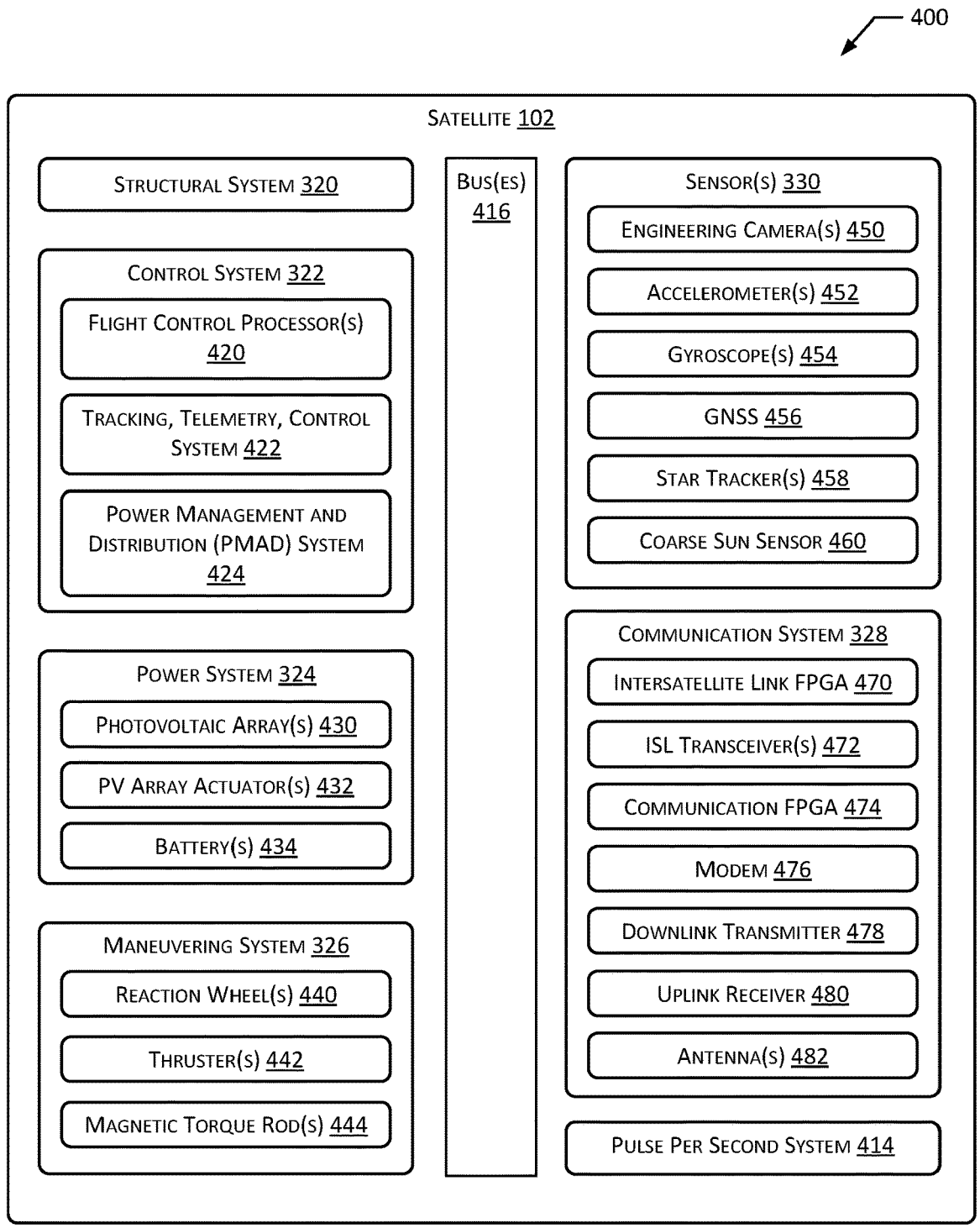
FIG. 4 is a block diagram of some systems associated with the satellite, according to some implementations.

FIG. 4 is a block diagram at 400 of some systems associated with the satellite 102, according to some implementations. The satellite 102 may comprise the structural system 320, the control system 322, the power system 324, the maneuvering system 326, one or more sensors 330, and the communication system 328. A pulse per second (PPS) system 414 may be used to provide timing reference to the systems onboard the satellite 102. One or more buses 416 may be used to transfer data between the systems onboard the satellite 102. In some implementations, redundant buses 416 may be provided. The buses 416 may include, but are not limited to, data buses such as Controller Area Network Flexible Data Rate (CAN FD), Ethernet, Serial Peripheral Interface (SPI), and so forth. In some implementations the buses 416 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 320 comprises one or more structural elements to support operation of the satellite 102. For example, the structural system 320 may include trusses, struts, panels, and so forth. The components of other systems may be affixed to, or housed by, the structural system 320. For example, the structural system 320 may provide mechanical mounting and support for solar panels in the power system 324. The structural system 320 may also provide for thermal control to maintain components of the satellite 102 within operational temperature ranges. For example, the structural system 320 may include louvers, heat sinks, radiators, and so forth.

The control system 322 provides various services, such as operating the onboard systems, resource management, providing telemetry, processing commands, and so forth. For example, the control system 322 may direct operation of the communication system 328. The control system 322 may include one or more flight control processors 420. The flight control processors 420 may comprise one or more processors, FPGAs, and so forth. A tracking, telemetry, and control (TTC) system 422 may include one or more processors, radios, and so forth. For example, the TTC system 422 may comprise a dedicated radio transmitter and receiver to receive commands from a ground station 306, send telemetry to the ground station 306, and so forth. A power management and distribution (PMAD) system 424 may direct operation of the power system 324, control distribution of power to the systems of the satellite 102, control battery 434 charging, and so forth.

The power system 324 provides electrical power for operation of the components onboard the satellite 102. The power system 324 may include components to generate electrical energy. For example, the power system 324 may comprise one or more photovoltaic arrays 430 comprising a plurality of photovoltaic cells, thermoelectric devices, fuel cells, and so forth. One or more PV array actuators 432 may be used to change the orientation of the photovoltaic array(s) 430 relative to the satellite 102. For example, the PV array actuator 432 may comprise a motor. The power system 324 may include components to store electrical energy. For example, the power system 324 may comprise one or more batteries 434, fuel cells, and so forth.

The maneuvering system 326 maintains the satellite 102 in one or more of a specified orientation or reference lattice orbit 104. For example, the maneuvering system 326 may stabilize the satellite 102 with respect to one or more axes. In another example, the maneuvering system 326 may move the satellite 102 to a specified reference lattice orbit 104. The maneuvering system 326 may include one or more of reaction wheel(s) 440, thrusters 442, magnetic torque rods 444, solar sails, drag devices, and so forth. The thrusters 442 may include, but are not limited to, cold gas thrusters, hypergolic thrusters, solid-fuel thrusters, ion thrusters, arcjet thrusters, electrothermal thrusters, and so forth. During operation, the thrusters 442 may expend propellent. For example, an electrothermal thruster may use water as propellent, using electrical power obtained from the power system 324 to expel the water and produce thrust. During operation, the maneuvering system 326 may use data obtained from one or more of the sensors 330.

The satellite 102 includes one or more sensors 330. The sensors 330 may include one or more engineering cameras 450. For example, an engineering camera 450 may be mounted on the satellite 102 to provide images of at least a portion of the photovoltaic array 430. Accelerometers 452 provide information about acceleration of the satellite 102 along one or more axes. Gyroscopes 454 provide information about rotation of the satellite 102 with respect to one or more axes. The sensors 330 may include a global navigation satellite system (GNSS) 456 receiver, such as a Global Positioning System (GPS) receiver, to provide information about the position of the satellite 102 relative to Earth 106. In some implementations the GNSS 456 may also provide information indicative of velocity, orientation, and so forth. One or more star trackers 458 may be used to determine an orientation of the satellite 102. A coarse sun sensor 460 may be used to detect the sun, provide information on the relative position of the sun with respect to the satellite 102, and so forth. The satellite 102 may include other sensors 330 as well. For example, the satellite 102 may include a horizon detector, radar, lidar, and so forth.

The communication system 328 provides communication with one or more other devices, such as other satellites 102, ground stations 306, user terminals 308, and so forth. The communication system 328 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other satellites 102, ground stations 306, user terminals 308, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 328 may be output to other systems, such as to the control system 322, for further processing. Output from a system, such as the control system 322, may be provided to the communication system 328 for transmission.

The communication system 328 may include hardware to support the intersatellite link 390. For example, an intersatellite link FPGA 470 may be used to modulate data that is sent and received by an ISL transceiver 472 to send data between satellites 102. The ISL transceiver 472 may operate using radio frequencies, optical frequencies, and so forth.

A communication FPGA 474 may be used to facilitate communication between the satellite 102 and the ground stations 306, UTs 308, and so forth. For example, the communication FPGA 474 may direct operation of a modem 476 to modulate signals sent using a downlink transmitter 478 and demodulate signals received using an uplink receiver 480. The satellite 102 may include one or more antennas 482. For example, one or more parabolic antennas may be used to provide communication between the satellite 102 and one or more ground stations 306. In another example, a phased array antenna may be used to provide communication between the satellite 102 and the UTs 308.

The communication system 328 may be operated to mitigate interference with geosynchronous satellites 158. For example, the communication system 328 may operate the antennas 482 to avoid geosynchronous exclusion areas 530 as described next.

Figure 5:
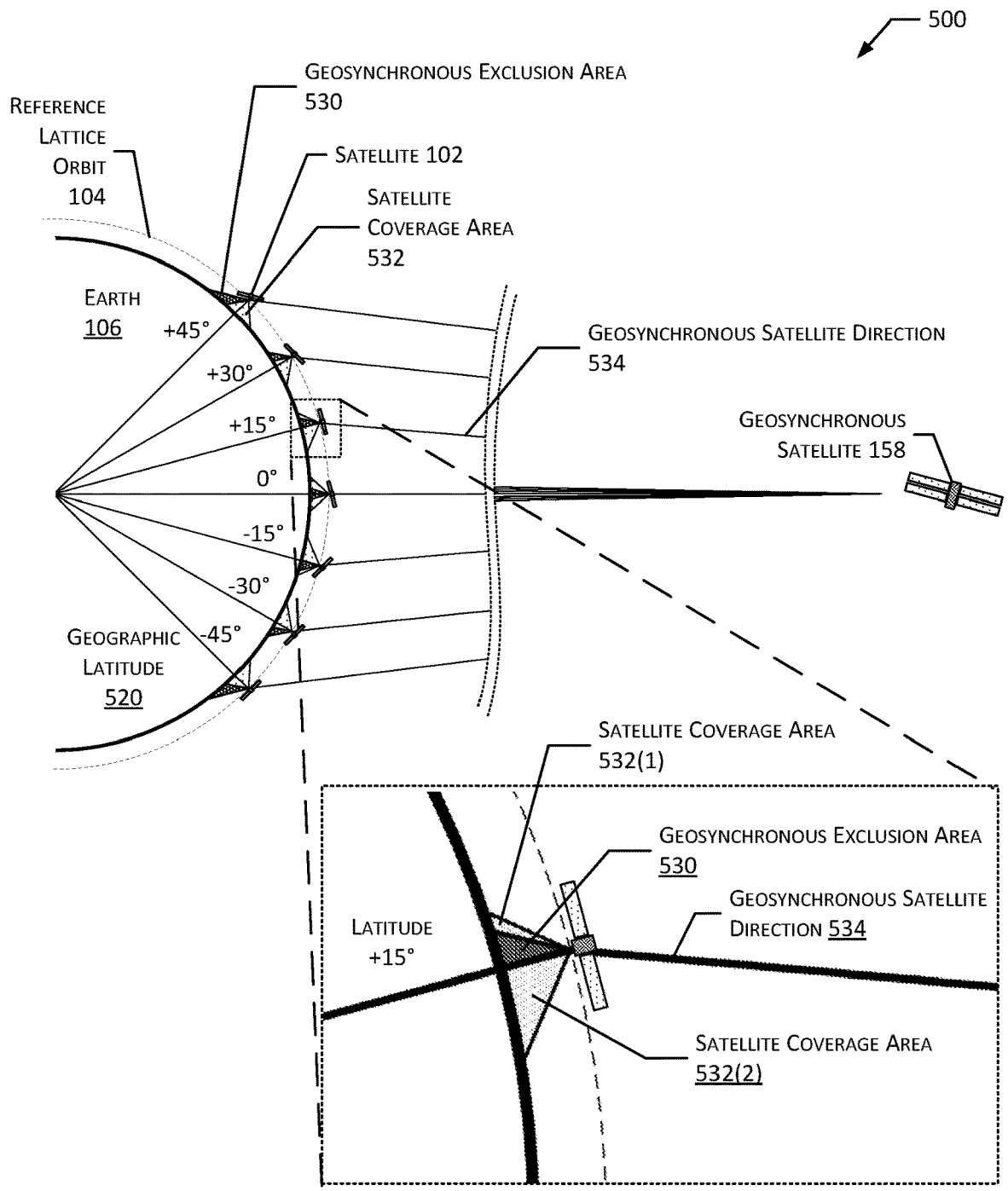
FIG. 5 illustrates geosynchronous exclusion areas, according to some implementations.

FIG. 5 illustrates at 500 geosynchronous exclusion areas, according to some implementations. Depicted is a portion of the Earth 106 showing various geographic latitudes 520 and a portion of a reference lattice orbit 104. Several satellites 102 are shown in the reference lattice orbit 104. Depicted are geosynchronous exclusion areas 530 and satellite coverage areas 532 associated with respective satellites 102. A geosynchronous satellite direction 534 indicates a line extending from a location in the geosynchronous exclusion area 530 to the geosynchronous satellite 158.

During operation, the satellites 102 of the constellation 108 may be prevented from transmitting a signal into the geosynchronous exclusion areas 530. In comparison, the satellites 102 of the constellation 108 may transmit signals into the satellite coverage areas 532.

The size and shape of the geosynchronous exclusion area 530 associated with satellites 102 in the constellation 108 varies with respect to the geographic latitude 520. For example, an enlarged view depicts +15 degrees latitude, at which a geosynchronous exclusion area 530 is shown, with a first satellite coverage area 532(1) to the north and a second satellite coverage area 532(2) to the south. Other factors that may influence the size and shape of the satellite coverage areas 532 and the geosynchronous exclusion areas 530 may include transmit beamwidth 160, transmit power, altitude 112, receive beamwidth 162, and so forth.

Figure 6:
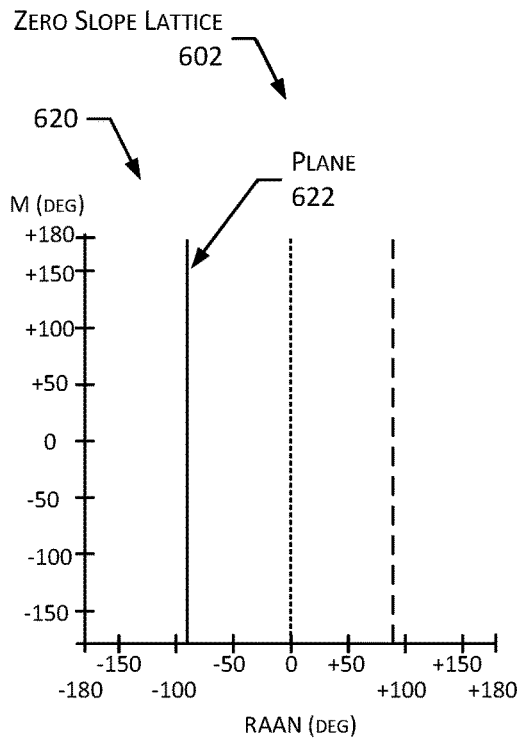
FIG. 6 illustrates graphs of a zero slope lattice and a nonzero slope lattice, according to one implementation.
Figure 6:
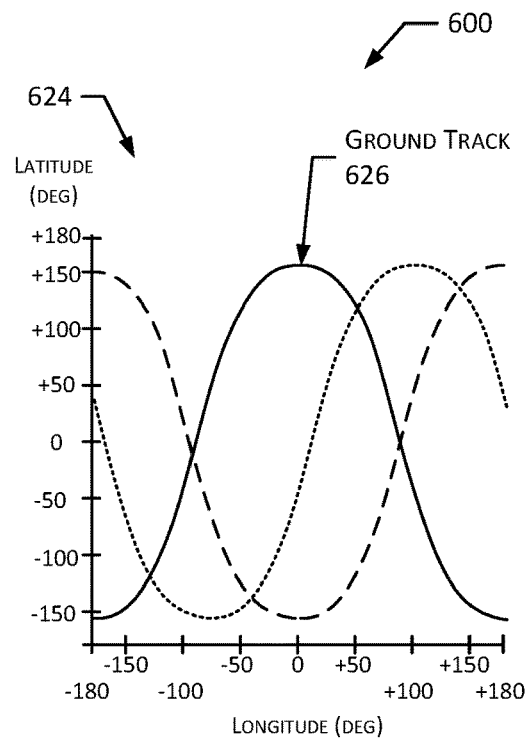
Figure 6:
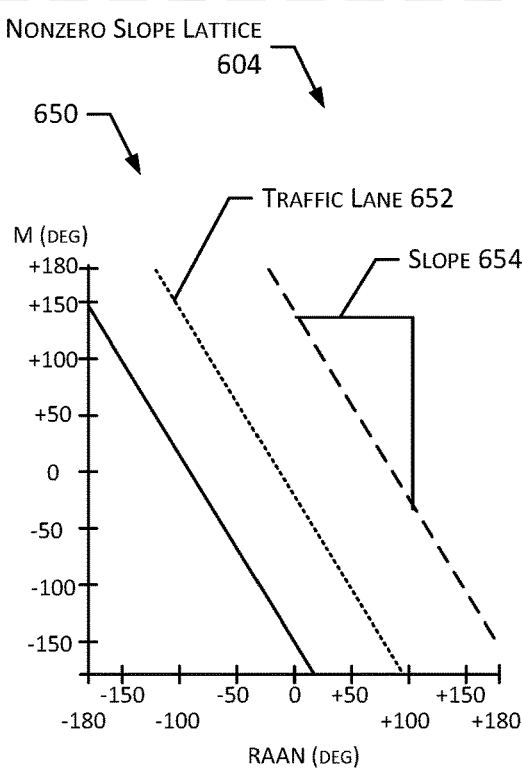
Figure 6:
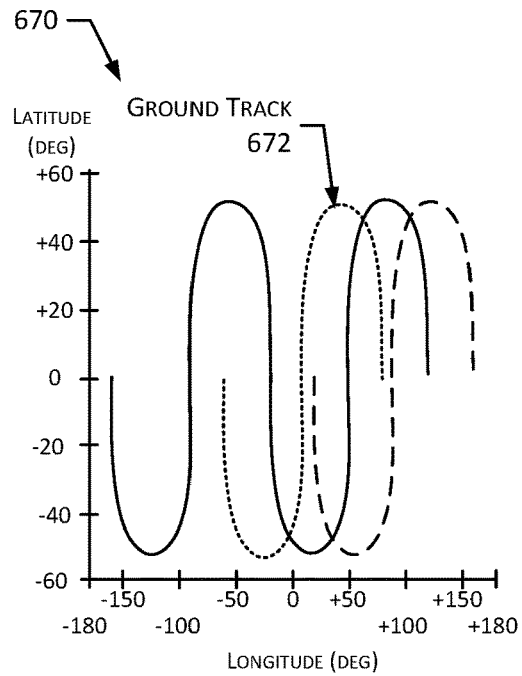

FIG. 6 illustrates at 600 graphs of a zero slope lattice 602 and a nonzero slope lattice 604, according to one implementation.

The zero slope lattice 602 is depicted with regard to graph 620 and graph 624.

The graph 620 depicts RAAN (in degrees) along a horizontal axis ranging from −180 to +180 degrees, where −180 and +180 are equivalent. The graph 620 depicts M (in degrees) along a vertical axis ranging from −180 to +180 degrees, where −180 and +180 are equivalent. Depicted are three orbital planes 622, consisting of vertical lines (zero slope) in the RAAN and M space shown in the graph 620.

The graph 624 depicts longitude (in degrees) with respect to Earth 106 along a horizontal axis ranging from −180 to +180 degrees, where −180 and +180 are equivalent. The graph 624 depicts latitude (in degrees) with respect to Earth 106 ranging from −180 to +180 degrees, where −180 and +180 are equivalent. Depicted in the graph 624 are ground tracks 626 of the three orbital planes 622 shown in the graph 620.

The nonzero slope lattice 604 is depicted with regard to a graph 650 and a graph 670.

The graph 650 depicts RAAN (in degrees) along a horizontal axis ranging from −180 to +180 degrees, where −180 and +180 are equivalent. The graph 650 depicts M (in degrees) along a vertical axis ranging from −180 to +180 degrees, where −180 and +180 are equivalent. Depicted are three traffic lanes 652, each exhibiting a slope 654 in the RAAN and M space shown in the graph 650.

In one implementation, the traffic lane 652 may comprise a set of satellites 102 that provide coverage along a contiguous strip of the Earth 106.

The slope 654 may be expressed in terms of degrees relative to the horizontal axis of the graph, or a dimensionless number that is calculated as a change in RAAN divided by a change in M.

The RAAN/M space such as shown in graph 650 may be considered representative of a toroidal topology, flattened onto the page. As a satellite 102 represented in the RAAN/M space moves, it will exit one side of the graph and re-enter the graph on the opposite side.

The graph 670 depicts longitude (in degrees) with respect to Earth 106 along a horizontal axis ranging from −180 to +180 degrees, where −180 and +180 are equivalent. The fourth graph 670 depicts latitude (in degrees) with respect to Earth 106 ranging from −60 to +60 degrees. Depicted in the graph 670 are ground tracks 672 of the three traffic lanes 652 shown in the graph 650.

Figure 7:
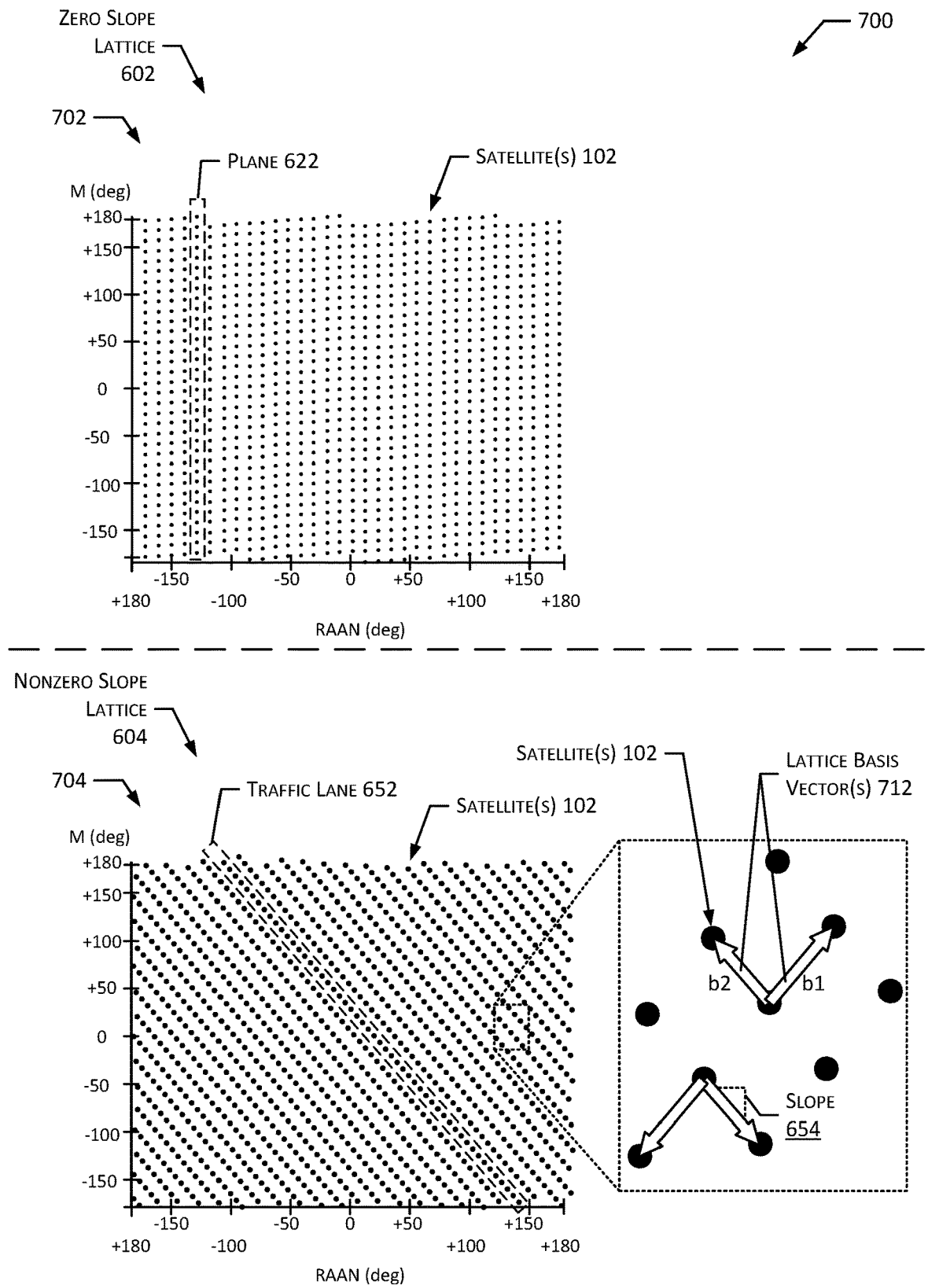
FIG. 7 illustrates additional graphs of a zero slope lattice and a nonzero slope lattice, according to one implementation.

FIG. 7 illustrates at 700 additional graphs of a zero slope lattice 602 and a nonzero slope lattice 604 depicting individual satellites 102, according to one implementation.

The zero slope lattice 602 is depicted with regard to graph 702 in which individual satellites 102 are represented.

The graph 702 depicts RAAN (in degrees) along a horizontal axis ranging from −180 to +180 degrees, where −180 and +180 are equivalent. The graph 702 depicts M (in degrees) along a vertical axis ranging from −180 to +180 degrees, where −180 and +180 are equivalent. A plane 622 is outlined, designating the satellites 102 in that plane 622.

The nonzero slope lattice 604 is depicted with regard to graph 704.

The graph 704 depicts RAAN (in degrees) along a horizontal axis ranging from −180 to +180 degrees, where −180 and +180 are equivalent. The graph 704 depicts M (in degrees) along a vertical axis ranging from −180 to +180 degrees, where −180 and +180 are equivalent. A traffic lane 652 is outlined, designating the satellites 102 in that traffic lane 652.

For ease of visualization, consider that the graphs 702 and 704 depict an instance in time. If the graphs were to be animated, as time processes individual satellites 102 would appear in these graphs to move vertically.

The satellites 102, each represented by a point in the lattice, form a regular lattice with respect to RAAN and M, as shown.

An enlargement depicts several satellites 102 and associated lattice basis vectors 712. The lattice basis vectors 712 may be used to describe relative satellite positions in the constellation 108. The first lattice vector b1 is directed from a satellite 102 in the lattice that is located in a first traffic lane 652 towards an adjacent satellite 102 in an adjacent traffic lane 652. The second lattice vector b2 is directed from a satellite 102 in the traffic lane 652 to an adjacent satellite 102 in the same traffic lane 652. The lattice basis vectors 712 may also be indicative of dominant directions in the lattice. In this illustration, b2 corresponds to the slope 654. In some implementations the distance between the traffic lanes 652 may be greater than the distribution distance between satellites 102 in the same traffic lane 652. For example, b1 may be greater than b2.

In some implementations traffic lanes 652 may be configured such that the motion of satellites 102 therein are in opposing directions with respect to the Earth 106. For example, a first traffic lane 652 may have satellites 102 moving in a first direction of motion relative to Earth 106, while a second traffic lane 652 that is adjacent has satellites 102 moving in a second direction relative to Earth 106 that is opposite the first direction.

The traffic lanes 652 are an emergent wave behavior that results from the parameters of the lattice, such as the slope 654 being nonzero.

Figure 8:
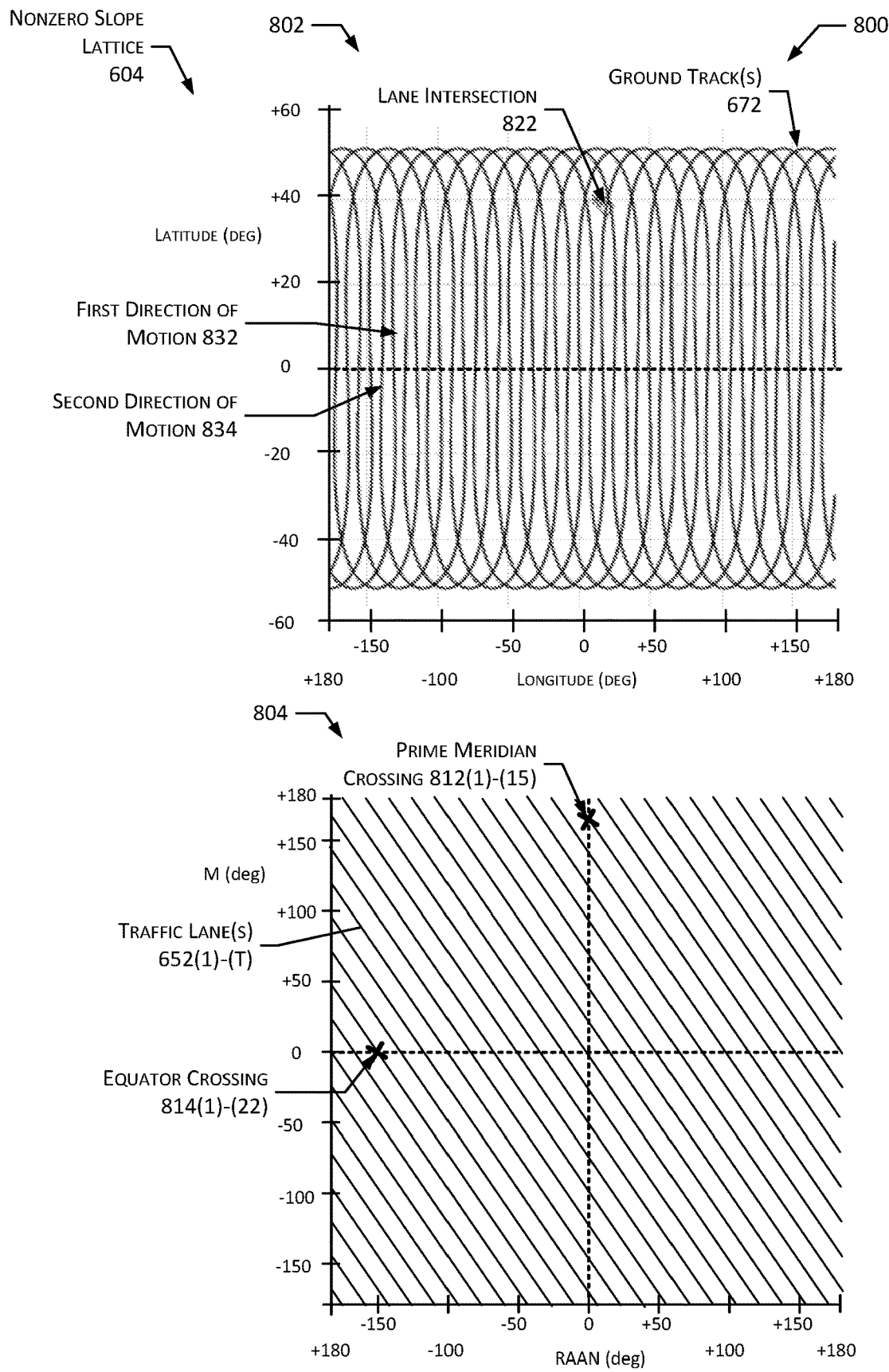
FIG. 8 illustrates additional graphs of a nonzero slope lattice, according to one implementation.

FIG. 8 illustrates at 800 additional graphs of a nonzero slope lattice 604, according to one implementation.

A first graph 802 depicts longitude (in degrees) with respect to Earth 106 along a horizontal axis ranging from −180 to +180 degrees, where −180 and +180 are equivalent. The first graph 802 depicts latitude (in degrees) with respect to Earth 106 ranging from −60 to +60 degrees. Depicted in the graph 802 are ground tracks 672 of the satellites 102 depicted in graph 704.

As shown in 802, the relatively vertical (with respect to geographic north and south) ground tracks 672 are well ordered and they are substantially parallel to one another for much of their respective orbits. As a result coverage is optimized and the ability to accommodate GSO exclusion areas 530 is improved.

In some implementations, satellites 102 in adjacent traffic lanes 652 may move in opposite directions with respect to Earth 106. For example, at a given moment, a first direction of motion 832 may have satellites 102 proceeding northward while a second direction of motion 834 may have satellites 102 proceeding southward.

A graph 804 depicts RAAN (in degrees) along a horizontal axis ranging from −180 to +180 degrees, where −180 and +180 are equivalent. The graph 804 depicts M (in degrees) along a vertical axis ranging from −180 to +180 degrees, where −180 and +180 are equivalent. In this graph 804, each traffic lane 652(1)-(T) is depicted as line. Individual satellites 102 are not depicted for ease of illustration, and not as a limitation.

A set of orbital parameters 120 described by the nonzero slope lattice 604 exhibit traffic lanes 652(1)-(T) having a number of prime meridian crossings 812(1)-(P) at epoch and equator crossings 814(1)-(Q). In the example depicted, there are prime meridian crossings 812(1)-(15) and equator crossings 814(1)-(22). The traffic lanes 652 may be configured to be symmetric in that they are completely contained and self-connected within the RAAN/M space such as depicted in graph 804. For example, considering the RAAN/M space as a toroid, traffic lanes 652 may be deemed symmetric if they form a closed loop.

It is noted that the traffic lanes 652 with respect to RAAN and M do not intersect one another. In comparison, the actual orbits as deployed, and the corresponding grounds tracks 672 such as shown at graph 802 do intersect.

Figure 9:
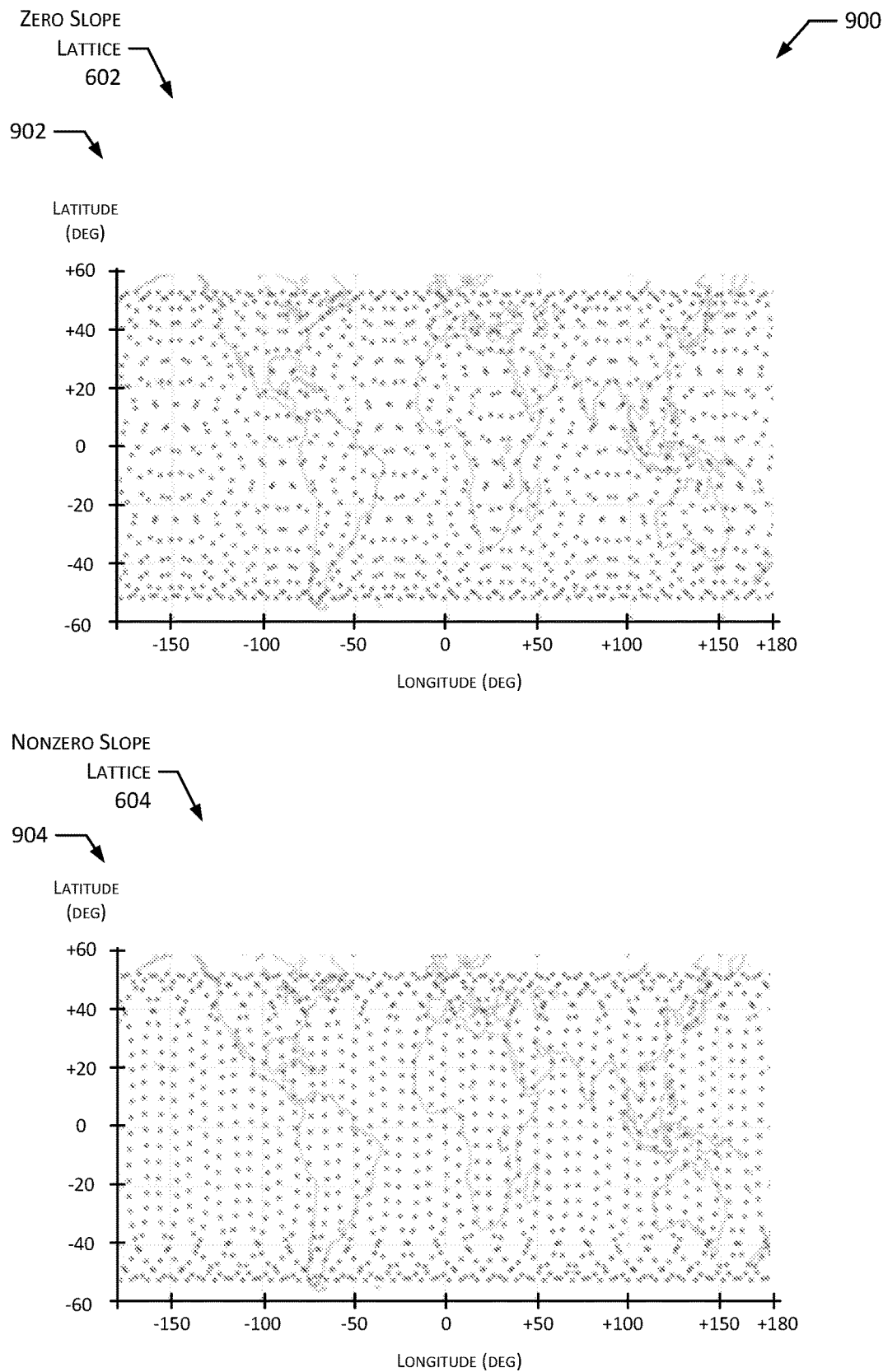
FIG. 9 illustrates relative positions of satellites in the zero slope lattice and nonzero slope lattice, according to one implementation.

FIG. 9 illustrates at 900 relative positions of satellites 102 in the zero slope lattice 602 and nonzero slope lattice 604, according to one implementation.

The zero slope lattice 602 is depicted in graph 902. Graph 902 depicts longitude (in degrees) with respect to Earth 106 along a horizontal axis ranging from −180 to +180 degrees, where −180 and +180 are equivalent. The graph 902 depicts latitude (in degrees) with respect to Earth 106 ranging from −60 to +60 degrees, where −60 and +60 are equivalent. Depicted in the graph 902 are individual satellites 102 of the constellation 108 at a moment in time, as positioned according to the zero slope lattice 602, such as using conventional planes 622.

In this graph 902 there is some "clumping" visible in which some pairs of satellites 102 are relatively close. This reduces effective coverage of the satellites 102 and reduces overall network efficiency.

The nonzero slope lattice 604 is depicted in graph 904. Graph 904 depicts longitude (in degrees) with respect to Earth 106 along a horizontal axis ranging from −180 to +180 degrees, where −180 and +180 are equivalent. The graph 904 depicts latitude (in degrees) with respect to Earth 106 ranging from −60 to +60 degrees, where −60 and +60 are equivalent. Depicted in the graph 904 are individual satellites 102 of the constellation 108 at a moment in time, as positioned according to a nonzero slope lattice 604.

In comparison to 902, the arrangement of satellites 102 afforded by the nonzero slope lattice 604 is more evenly distributed. As a result, the overall network efficiency is improved.

Figure 10:
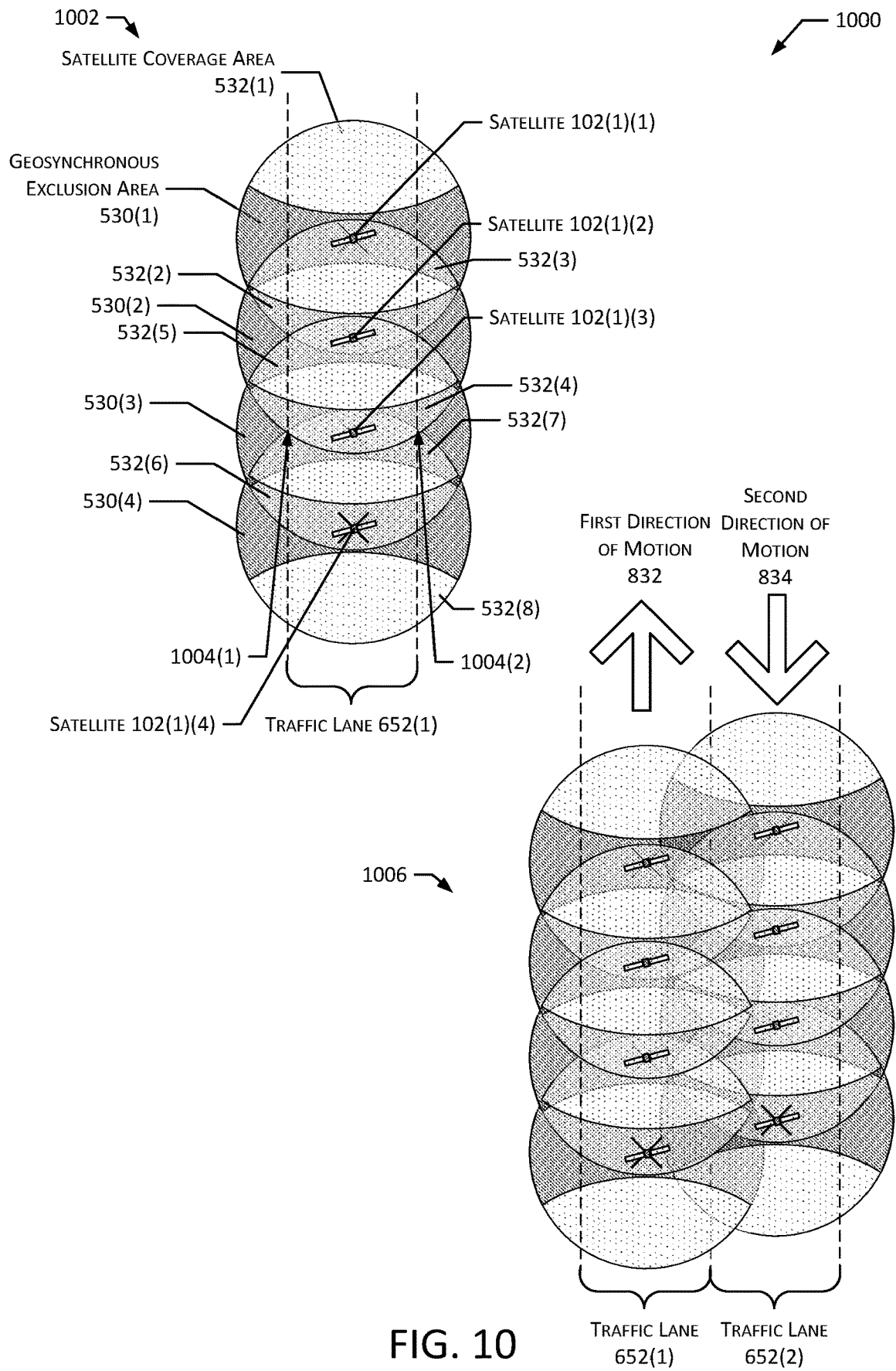
FIG. 10 illustrates mitigation of geosynchronous exclusion areas using nonzero slope lattice orbits, according to one implementation.

FIG. 10 illustrates at 1000 mitigation of geosynchronous exclusion areas 530 using a nonzero slope lattice 604, according to one implementation. In this illustration, coverage areas on the Earth 106 are depicted. Shown are geosynchronous exclusion areas 530 and satellite coverage areas 532. These areas are depicted as circular for ease of illustration and not necessarily as a limitation. The shape of these areas may vary based on design and operation of the antennas 482, latitude associated with the satellite 102, and so forth.

To mitigate the geosynchronous exclusion areas 530, adjacent satellites 102 in the same traffic lane 652 may be utilized, such that their respective satellite coverage areas 532 overlap and provide coverage within at least a portion of the geosynchronous exclusion areas 530.

At 1002 a portion of a first traffic lane 652(1) is shown. Satellite 102(1)(1) is shown, and provides satellite coverage areas 532(1)-(2) and has geosynchronous exclusion area 530(1). Satellite 102(1)(2) provides coverage area 532(3)-(4) and has geosynchronous exclusion area 530(2). Satellite 102(1) (3) provides coverage area 532(5)-(6) and has geosynchronous exclusion area 530(3). The edges of the first traffic lane 652(1) may be specified by the points at which a geosynchronous exclusion area 530 is not provided with coverage by an adjacent satellite 102 in the same lane. A lane width may comprise a maximum width for which the ground track over a specified portion of the Earth 106 is covered by a transmit beamwidth 160 or footprint from at least one satellite 102 that is not subject to geosynchronous exclusion.

The lane width may be determined based at least in part on the satellite 102 transmit beamwidth 160 and overlap between transmissions from adjacent satellites 102 in one or more of the same or different traffic lanes 652. Other factors considered in determining the lane width may include altitude of the satellite 102, relative pointing direction, shape of the transmit beamwidth 160 when it impinges on Earth 106, maximum number of satellites 102 that may be allocated to a traffic lane 652, and so forth. For example, given an altitude of 630 km, a transmit beamwidth 160 of 6 degrees, and assuming a circular coverage area, the diameter of a circular satellite coverage area 532 on Earth 106 may be calculated as approximately 66 km. The geosynchronous exclusion area 530 may be calculated based on the latitude of the coverage area or a portion thereof, such as a geometric center of the coverage area. The individual geosynchronous coverage areas 530 may be arranged such that they overlap, with a satellite coverage area 532 from one satellite 102 providing coverage into the geosynchronous exclusion area 530 of another. The width of the traffic lane 652 may thus be determined as a distance between points of intersection 1004 between adjacent satellite coverages areas 532. Continuing the earlier example, the width of the traffic lane 652(1), such as measured between intersection points 1004(1) and 1004 (2) may be about 35 km.

In other implementations, the lane width may be specified and other parameters of the reference lattice orbit 104 may be determined. For example, given a specified lane width, a distance between adjacent satellites 102 in the same traffic lane 652 may be determined to provide the overlap in coverage that results in the specified lane width.

At 1006 a portion of the first traffic lane 652(1) and a second traffic lane 652(2) are shown. As described above, the traffic lanes 652 may be configured such that the movement of the satellites 102 therein with regard to Earth 106 are in opposite directions. For example, satellites 102 associated with the first traffic lane 652(1) may move in a first direction of motion 832 relative to the Earth 106 of "north" while satellites 102 associated with the second traffic lane 652(2) may move in a second direction of motion 834 relative to Earth 106 of "south".

As discussed with regard to graphs 670 and 802, the use of the techniques herein allows for orbital configurations in which the motion of satellites 102 along adjacent ground tracks 672 is relatively parallel for substantial portions of the ground track 672. This allows for more efficient utilization of the satellite coverage areas 532 provided along the resulting ground track 672.

As shown at 1006, adjacent traffic lanes 652 such as the first traffic lane 652(1) and the second traffic lane 652(2) may be arranged such that the boundaries of their respective lanes abut as shown, or in some implementations overlap.

The satellite coverage area 532 that extends beyond the edges of the traffic lane 652 may be used to further mitigate the geosynchronous exclusion areas 530 in the adjacent traffic lane 652. For example, a first satellite 102(1)(1) in the first traffic lane 652 may have a satellite coverage area 532 that extends into the second traffic lane 652 and fills in or overlaps a geosynchronous exclusion area 530 in that second traffic lane 652.

As a result of the nonzero slope lattice 604, the overall area of the effective geosynchronous exclusion areas 530 is substantially reduced. This results in a substantial improvement in overall efficiency of the constellation 108. In some implementations the plurality of RAAN values and plurality of M values that specify the nonzero slope lattice 604 may be determined by generating a set of possible lattices and testing the lattices for one or more performance parameters, such as minimizing the geosynchronous exclusion areas 530.

Figure 11:
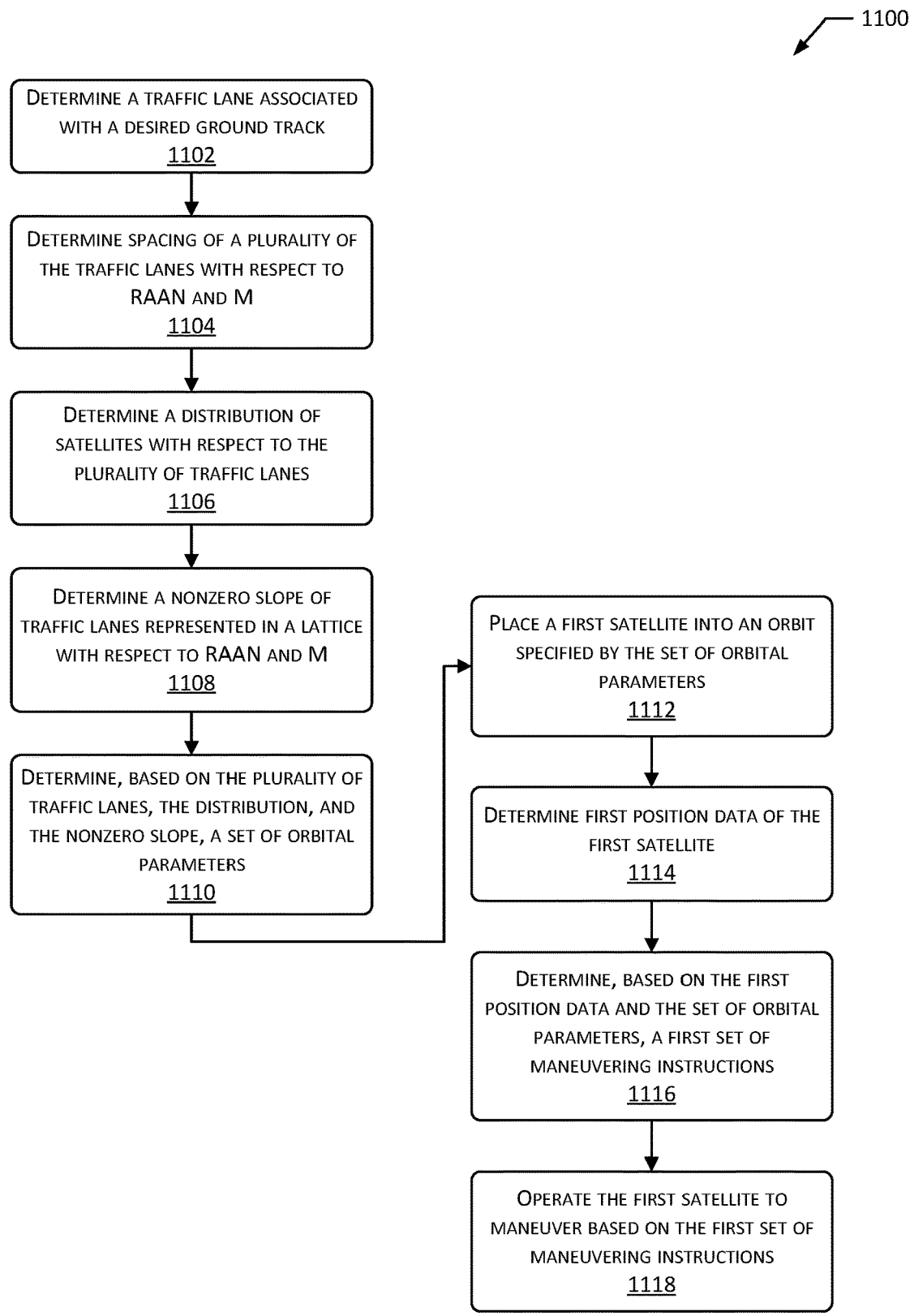
FIG. 11 illustrates a process of determining and maintaining orbits of a constellation that mitigates interference with geosynchronous satellites, according to some implementations.

FIG. 11 illustrates a process 1100 of determining and maintaining orbits 304 of a constellation 108 that mitigates interference with geosynchronous satellites, according to some implementations. The process 1100 may be implemented by one or more of the satellites 102, the management system 350, or other systems.

At 1102 a proposed traffic lane 652 that is associated with a desired ground track 626 is determined. For example, the traffic lane 652 may be selected to provide a desired shape with regard to geographic latitude and longitude that will provide coverage appropriate to operation of the constellation 108. For example, the desired ground track 626 may be determined based on the altitude 112, transmit beamwidth 160, capabilities of the maneuvering system 326, and so forth.

At 1104 spacing of a plurality of the traffic lanes 652 is determined, with respect to RAAN and M. For example, the spacing between traffic lanes 652 is determined by the lane width. The lane width may be determined based on the altitude 112, transmit beamwidth 160, capabilities of the maneuvering system 326, and so forth. The lane width may comprise the maximum width for which the ground track 626 over a specified portion of the Earth 106 is covered by a transmit beamwidth 160 or footprint from at least one satellite 102 that is not subject to geosynchronous exclusion.

For example, the spacing may be set to provide a lane width that allows satellite coverage areas 532 of satellites 102 in a first traffic lane 652 to overlap and provide coverage within the geosynchronous exclusion areas 530, as described with respect to FIG. 10.

At 1106 a distribution of satellites with respect to individual ones of the plurality of traffic lanes 652 is determined. The distribution may be determined based on the altitude 112, transmit beamwidth 160, capabilities of the maneuvering system 326, and so forth. For example, as the distance between the satellites 102 within the traffic lane 652 is reduced, the overlap of their respective transmit beamwidth 160 may increase, resulting in a widening of the lane width. However, as that distance is reduced, demands on the maneuvering system 326 may be increased to avoid conjunction events.

At 1108 a nonzero slope 654 of traffic lanes 652 representing satellites 102 in a lattice with respect to RAAN and M is determined. For example, all traffic lanes 652 may exhibit the same slope 654. The slope 654 may be varied during analysis to obtain a configuration of the constellation 108 that meets operational requirements. The nonzero slope 654 has a slope 654 that is not equal to zero. In another implementation, the nonzero slope 654 may have a value of between −0.75 and −0.46, corresponding to about −53 degrees and −65 degrees, respectively. In one implementation, a range of slopes may be assessed. For example, reference lattice orbits 104 associated with slopes of between −50 degrees and −68 degrees may be assessed, and a particular nonzero slope 654 selected. The range of slopes may be based on a specified inclination value. The selection may be based on a determination that the selected nonzero slope 654 provides desired attributes, such as coverage to UTs 108 at various latitudes, is less than a maximum number of permissible satellites 102, and so forth.

At 1110, based on the plurality of traffic lanes, the distribution, and the slope 654, a set of orbital parameters 120 are determined that represent the reference lattice orbit 104. As mentioned earlier with regard to FIGS. 6-8, each satellite 102 is represented by a point in the lattice. In some implementations, the set of orbital parameters 120 may be converted into other notations for further processing. For example, the set of orbital parameters 120 may be converted from representation in the RAAN and M space into Walker-Delta parameters.

At 1112 a first satellite 102(1)(1) is placed into an orbit 304 specified by the set of orbital parameters 120. For example, the first satellite 102(1)(1) may be launched from Earth 106 or repositioned from another orbit 304.

At 1114 first position data 332(1) of the first satellite 102(1)(1) is determined. For example, the sensors 330 onboard the satellite 102(1)(1) may acquire the first position data 332(1).

At 1116 based on the first position data 332(1) and the set of orbital parameters 120 that are associated with the first reference lattice orbit 104(1), a first set of maneuvering instructions 334(1) are determined.

At 1118 the first satellite 102(1)(1) is operated to maneuver based on the first set of maneuvering instructions 334(1). The maneuver(s) may be configured to place the first satellite 102(1)(1) to within one or more of a first threshold value of the first eccentricity value, a second threshold value of the associated RAAN, or a third threshold value of the associated M value. For example, the maneuver(s) may result in the first satellite 102(1)(1) attaining a particular position within a first station keeping volume.

In some implementations maneuvering of the satellites 102 may be constrained to a certain portion of a reference lattice orbit 104. For example, maneuvering may be prohibited while the satellite 102 is within ±15 of the argument of perigee 232. In some implementations, the portion of the reference lattice orbit 104 that is excluded from maneuvering may be selected based on use of the satellite 102 to provide communication services. For example, during maneuvering the satellite 102 may be unable to provide communication services to the UTs 308. As a result, maneuvering may be limited to portions of the orbit 304 that pass over areas in which those communication services are not needed, or over areas in which other satellites 102 are available to provide service in place of the maneuvering satellite 102.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of controlling satellites, the method comprising:
   determining a first set of orbital parameters comprising:
      a first traffic lane associated with a first plurality of satellites, wherein each satellite of the first plurality of satellites is associated with:
         a respective one of a first plurality of right ascension of the ascending node (RAAN) values, and
         a respective one of a first plurality of mean anomaly (M) values, and
      a second traffic lane associated with a second plurality of satellites, wherein each satellite of the second plurality of satellites is associated with:
         a respective one of a second plurality of RAAN values, and
         a respective one of a second plurality of M values, wherein:
         the first plurality of RAAN values and the first plurality of M values, and
         the second plurality of RAAN values and the second plurality of M values form a regular lattice with respect to RAAN and M;
   determining the regular lattice with respect to RAAN and M such that:
      a first distance within the regular lattice between adjacent satellites in a same traffic lane is a first value,
      a second distance within the regular lattice between adjacent satellites in the first traffic lane and the second traffic lane is a second value, and
      the first value is less than the second value;
   placing the first plurality of satellites into orbits corresponding to the first traffic lane;
   determining, from respective ones of the first plurality of satellites, first position data;
   determining a first set of maneuvering instructions based at least in part on the first position data and the first set of orbital parameters associated with the first traffic lane; and
   based at least in part on the first set of maneuvering instructions, maneuvering the respective ones of the first plurality of satellites to within (i) a first threshold value of the associated RAAN value, and (ii) a second threshold value of the associated M value.

2. The method of claim 1, further comprising:
   determining that a first ground track associated with the first traffic lane is adjacent, with respect to Earth, to a second ground track associated with the second traffic lane;
   determining that the first traffic lane is associated with a first direction of motion with respect to Earth; and
   determining that the second traffic lane is associated with a second direction of motion with respect to Earth that is opposite the first direction of motion.

3. The method of claim 1, further comprising:
   determining that the first traffic lane has a first slope, with respect to the regular lattice with respect to RAAN and M, that is not equal to zero.

4. The method of claim 1, further comprising:
   determining a satellite transmit beamwidth associated with operation of respective ones of the first plurality of satellites; and
   determining a width of the first traffic lane and the second traffic lane, wherein the width is based at least in part on the satellite transmit beamwidth and overlap between transmissions from adjacent satellites in the first plurality of satellites that mitigate geosynchronous exclusion areas.

5. The method of claim 1, further comprising:
   determining a satellite transmit beamwidth associated with operation of respective ones of the first plurality of satellites; and
   determining one or more of the first plurality of RAAN values, the first plurality of M values, the second plurality of RAAN values, or the second plurality of M values such that coverage from satellites within the first traffic lane minimize geosynchronous exclusion areas.

6. The method of claim 1, further comprising:
   determining a satellite transmit beamwidth associated with operation of respective ones of the first plurality of satellites; and
   determining one or more of the first plurality of RAAN values, the first plurality of M values, the second plurality of RAAN values, or the second plurality of M values such that coverage from satellites within the first traffic lane and the second traffic lane minimize geosynchronous exclusion areas.

7. The method of claim 1, further comprising:
   determining that the first set of orbital parameters are associated with a first altitude; and
   determining that the first traffic lane and the second traffic lane as designated with respect to RAAN and M do not intersect, and wherein:
      the first traffic lane is associated with a first ground track,
      the second traffic lane is associated with a second ground track, and
      the first ground track intersects with the second ground track.

8. The method of claim 1, wherein:
   the first set of orbital parameters are determined based on capabilities of maneuvering systems associated with the first plurality of satellites and the second plurality of satellites.

9. A system comprising:
   a constellation comprising:
      a first plurality of satellites,
      a second plurality of satellites; and
      wherein each satellite of the constellation comprises a maneuvering system; and
   a first set of one or more processors executing instructions to:
      determine a first set of orbital parameters comprising:
         a first traffic lane associated with the first plurality of satellites, wherein each satellite of the first plurality of satellites is associated with:
            a respective one of a first plurality of right ascension of the ascending node (RAAN) values, and
            a respective one of a first plurality of mean anomaly (M) values, and
         a second traffic lane associated with the second plurality of satellites, wherein each satellite of the second plurality of satellites is associated with:
            a respective one of a second plurality of RAAN values, and a respective one of a second plurality of M values, wherein:
the first plurality of RAAN values and the first plurality of M values, and
the second plurality of RAAN values and the second plurality of M values form a regular lattice with respect to RAAN and M; and
wherein the first traffic lane has a first slope, with respect to the regular lattice with respect to RAAN and M, that is not equal to zero; and
operate the maneuvering systems of satellites in the first plurality of satellites based on the first set of orbital parameters.

10. The system of claim 9, wherein, with respect to the regular lattice with respect to RAAN and M:
a first distance within the regular lattice between adjacent satellites in a same traffic lane is a first value,
a second distance within the regular lattice between adjacent satellites in the first traffic lane and the second traffic lane is a second value, and
the first value is less than the second value.

11. The system of claim 9, wherein;
the first traffic lane is associated with a first ground track having a first direction of motion, and
the second traffic lane is associated with a second ground track having a second direction of motion that is opposite the first direction of motion.

12. The system of claim 9, the first set of one or more processors executing instructions to:
determine a satellite transmit beamwidth associated with operation of respective ones of the first plurality of satellites; and
determine one or more of the first plurality of RAAN values, the first plurality of M values, the second plurality of RAAN values, or the second plurality of M values such that coverage from satellites within the first traffic lane minimize geosynchronous exclusion areas.

13. The system of claim 9, the first set of one or more processors executing instructions to:
determine a satellite transmit beamwidth associated with operation of respective ones of the first plurality of satellites; and
determine one or more of the first plurality of RAAN values, the first plurality of M values, the second plurality of RAAN values, or the second plurality of M values such that coverage from satellites within the first traffic lane and the second traffic lane minimize geosynchronous exclusion areas.

14. The system of claim 9, wherein:
the first set of orbital parameters are based on capabilities of the maneuvering systems associated with the first plurality of satellites and the second plurality of satellites.

15. The system of claim 9, the first set of one or more processors executing instructions to:
determine, from respective ones of the first plurality of satellites, first position data;
determine a first set of maneuvering instructions based at least in part on the first position data and the first set of orbital parameters associated with the first traffic lane; and
wherein operation of the maneuvering systems of the satellites in the first plurality of satellites is based on the first set of maneuvering instructions.

16. A method performed by a first satellite in a constellation of satellites, the method comprising:
determining first position data based on one or more sensors of the first satellite;
retrieving a first set of orbital parameters comprising:
a first traffic lane associated with a first plurality of satellites, wherein each satellite of the first plurality of satellites is associated with:
a respective one of a first plurality of right ascension of the ascending node (RAAN) values, and
a respective one of a first plurality of mean anomaly (M) values, and
a second traffic lane associated with a second plurality of satellites, wherein each satellite of the second plurality of satellites is associated with:
a respective one of a second plurality of RAAN values, and
a respective one of a second plurality of M values, wherein:
the first plurality of RAAN values and the first plurality of M values, and
the second plurality of RAAN values and the second plurality of M values form a regular lattice with respect to RAAN and M;
determining that the first set of orbital parameters are associated with a first altitude;
determining that the first traffic lane and the second traffic lane as designated with respect to RAAN and M do not intersect, wherein:
the first traffic lane is associated with a first ground track,
the second traffic lane is associated with a second ground track, and
the first ground track intersects with the second ground track;
determining, based on the first position data and the first set of orbital parameters, a first set of maneuvering instructions; and
maneuvering, based on the first set of maneuvering instructions, the first satellite to within a first threshold value of the associated RAAN value, and a second threshold value of the associated M value.

17. The method of claim 16, further comprising:
determining the regular lattice with respect to RAAN and M such that:
a first distance within the regular lattice between adjacent satellites in a same traffic lane is a first value,
a second distance within the regular lattice between adjacent satellites in the first traffic lane and the second traffic lane is a second value, and
the first value is less than the second value.

18. The method of claim 16, further comprising:
determining that the first traffic lane has a first slope, with respect to the regular lattice with respect to RAAN and M, that is not equal to zero.

19. The method of claim 16, further comprising:
determining a satellite transmit beamwidth associated with operation of respective ones of the first plurality of satellites; and
determining one or more of the first plurality of RAAN values, the first plurality of M values, the second plurality of RAAN values, or the second plurality of M values such that geosynchronous exclusion areas are minimized.

20. The method of claim 16, further comprising:
determining the first set of orbital parameters based on capabilities of maneuvering systems associated with the first plurality of satellites and the second plurality of satellites.

* * * * *